(12) United States Patent
Swain et al.

(10) Patent No.: US 12,126,621 B2
(45) Date of Patent: Oct. 22, 2024

(54) MULTIPLE VENDOR AUTHORIZATION

(71) Applicant: SAP SE, Walldorf (DE)

(72) Inventors: Anita Kumari Swain, Berhampur (IN); Sateesh Babu Chilamakuri, Tirupati (IN)

(73) Assignee: SAP SE, Walldorf (DE)

( * ) Notice: Subject to any disclaimer, the term of this patent is extended or adjusted under 35 U.S.C. 154(b) by 273 days.

(21) Appl. No.: 17/589,776

(22) Filed: Jan. 31, 2022

(65) Prior Publication Data

US 2023/0179599 A1 Jun. 8, 2023

(30) Foreign Application Priority Data

Dec. 7, 2021 (IN) .............................. 202111056666

(51) Int. Cl.
*H04L 9/40* (2022.01)
(52) U.S. Cl.
CPC .......... *H04L 63/10* (2013.01); *H04L 63/0815* (2013.01)
(58) Field of Classification Search
CPC .............................. H04L 63/0815; H04L 63/10
See application file for complete search history.

(56) References Cited

U.S. PATENT DOCUMENTS

| | | | | |
|---|---|---|---|---|
| 8,875,166 | B2* | 10/2014 | Plewnia | G06F 21/335 |
| | | | | 725/5 |
| 2011/0119481 | A1* | 5/2011 | Auradkar | G06F 21/602 |
| | | | | 713/150 |
| 2019/0372957 | A1* | 12/2019 | Dunjic | G06Q 20/322 |
| 2021/0075615 | A1* | 3/2021 | Shaaban | H04L 9/3213 |
| 2022/0038544 | A1* | 2/2022 | Grinstein | H04L 63/0807 |
| 2023/0164131 | A1* | 5/2023 | G | H04L 63/0815 |
| | | | | 726/4 |

* cited by examiner

*Primary Examiner* — Kostas J Katsikis
(74) *Attorney, Agent, or Firm* — Klarquist Sparkman, LLP (57) ABSTRACT

Systems and processes for managing authorizations for multiple vendors at an enterprise service are provided. Responsive to a request to onboard an authorization for access to data resources of a targeted vendor, a central management server may receive, from an authorization server for the targeted vendor, authorization information. The authorization information may be received indirectly, via a security token service. An authorization reference object may be generated to store the authorization information, and the authorization reference object may be stored in a database. Subsequent requests for access to the data resources of the targeted vendor may be serviced using the authorization reference object stored in the database.

20 Claims, 9 Drawing Sheets

| FULL REPOSITORY | PROPERTY NAME | PROPERTY VALUE |
|---|---|---|
| ☐ AUTH PLUGINS | OAUTH_ENABLED | TRUE |
|    ☐ SECABC | | |
|    ☐ SECENTERPRISE | SELECTED_OAUTH_REFERENCE_CUID | FJIOJAFhIPOX |
|    ☐ SECDEF | | |

MULTIPLE VENDOR AUTHORIZATION

CROSS-REFERENCE TO RELATED APPLICATION

This application claims the benefit of Indian Provisional Patent Application No. 202111056666 filed on Dec. 7, 2021, the entirety of which is hereby incorporated by reference.

BACKGROUND

Authorization tools may be used to allow users to grant other entities (e.g., applications, users, websites, etc.) access to information and/or resources provided by a service without providing those entities login credentials of the user's account for that service. Vendors that provide the services may have authorization servers that service requests for authorization by issuing access tokens or other responses to allow access to protected information and/or resources. However, each vendor utilizes its own authorization server for such requests, and users may submit respective requests for each vendor each time authorization is to be provided.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In summary, the detailed description is directed to various innovative technologies for managing, processing, and servicing authorization requests for multiple vendors. In some examples, the disclosed technologies can be implemented as computer-readable media storing instructions which, when executed by one or more hardware processors, cause the hardware processors to perform the following actions. A request to onboard an authorization for access to data resources of a targeted vendor may be received. Authorization information may be received from an authorization server for the targeted vendor, and an authorization reference object may be generated, the authorization reference object storing the authorization information. The authorization reference object may be stored in a database. Subsequent requests for access to the data resources of the targeted vendor may be serviced using the authorization reference object stored in the database.

In some examples, the disclosed technologies can be implemented as a method performed by a computer. An example method includes receiving, at a central management server from an application or web server, a request to onboard an authorization for access to data resources of a plurality of targeted vendors, and redirecting the request to a security token service (STS) that has an established trust relationship with the targeted vendors. The example method further includes, for each of the targeted vendors, receiving, from a respective authorization server for the respective targeted vendor via the STS, respective authorization information including a respective authorization token for access to the data resources for the respective targeted vendor. The example method further includes, for each of the targeted vendors, generating a respective authorization reference object, the respective authorization reference object storing the respective authorization information including the respective authorization token for the respective targeted vendor. The authorization reference objects may be stored in a central management server database, and, responsive to receiving a subsequent request for logging into an account associated with a selected targeted vendor, the authorization reference may be fetched from the central management server database corresponding to the selected targeted vendor and access of the application or web server to the data resources of the selected targeted vendor may be granted using the authorization information from the authorization reference object corresponding to the selected targeted vendor.

In some examples, the disclosed technologies can be implemented in a system including one or more hardware processors with coupled memory, and computer-readable media storing instructions executable by the one or more hardware processors. The instructions include first and second instructions. The first instructions, when executed, cause an administrative user interface for configuring authorization servers managed by a central management server to be generated. The second instructions, when executed, cause, responsive to receiving user input to the user interface requesting to onboard authorization for access to data resources of a targeted vendor, a request to be generated that controls the central management server to receive, via an intermediate security token service (STS), authorization information from an authorization server for the targeted vendor. The request further controls the central management server to generate and store, in a database of the central management service, an authorization reference infoobject associated with the targeted vendor based on the authorization information, and grant subsequent requests for access to the data resources of the targeted vendor using the authorization reference object stored in the database.

The foregoing and other objects, features, and advantages disclosed will become more apparent from the following detailed description, which proceeds with reference to the accompanying figures.

DETAILED DESCRIPTION

Introduction and Overview

As described above, vendors may utilize mechanisms, such as an open authorization protocol (e.g., OAuth), for managing authorization to data resources and/or information associated with a user's account with the vendor. However, if a user attempts to submit authorization requests for accounts associated with multiple vendors, current approaches involve submitting multiple requests (e.g., requesting authorization for each vendor independently, targeting different vendor authorization servers, each time authorization is to be granted).

This disclosure describes a new approach to multi-vendor authorization, which includes providing a new infrastructure used to store multiple authorization server details related to OAuth Support locally in an enterprise service for a user/organization. To achieve this functionality, an authorization reference infoobject concept is introduced. This authorization reference infoobject is used to store all the authorization related information added by the configuration page in a central management server database. The disclosed framework and associated technologies help to achieve end-to-end single sign-on (SSO) with authentication and/or authorization (e.g., OAuth authentication and/or authorization) on top of identity providers (e.g., OpenID Connect). The disclosed technologies also provide provisions for configuring multiple authorization servers to support different database resources and/or data resources (e.g., cloud-based shareable document services, cloud-based storage drives, etc.). The above and additional details relating to the disclosed technologies are described further below.

Example System

Figure 1:
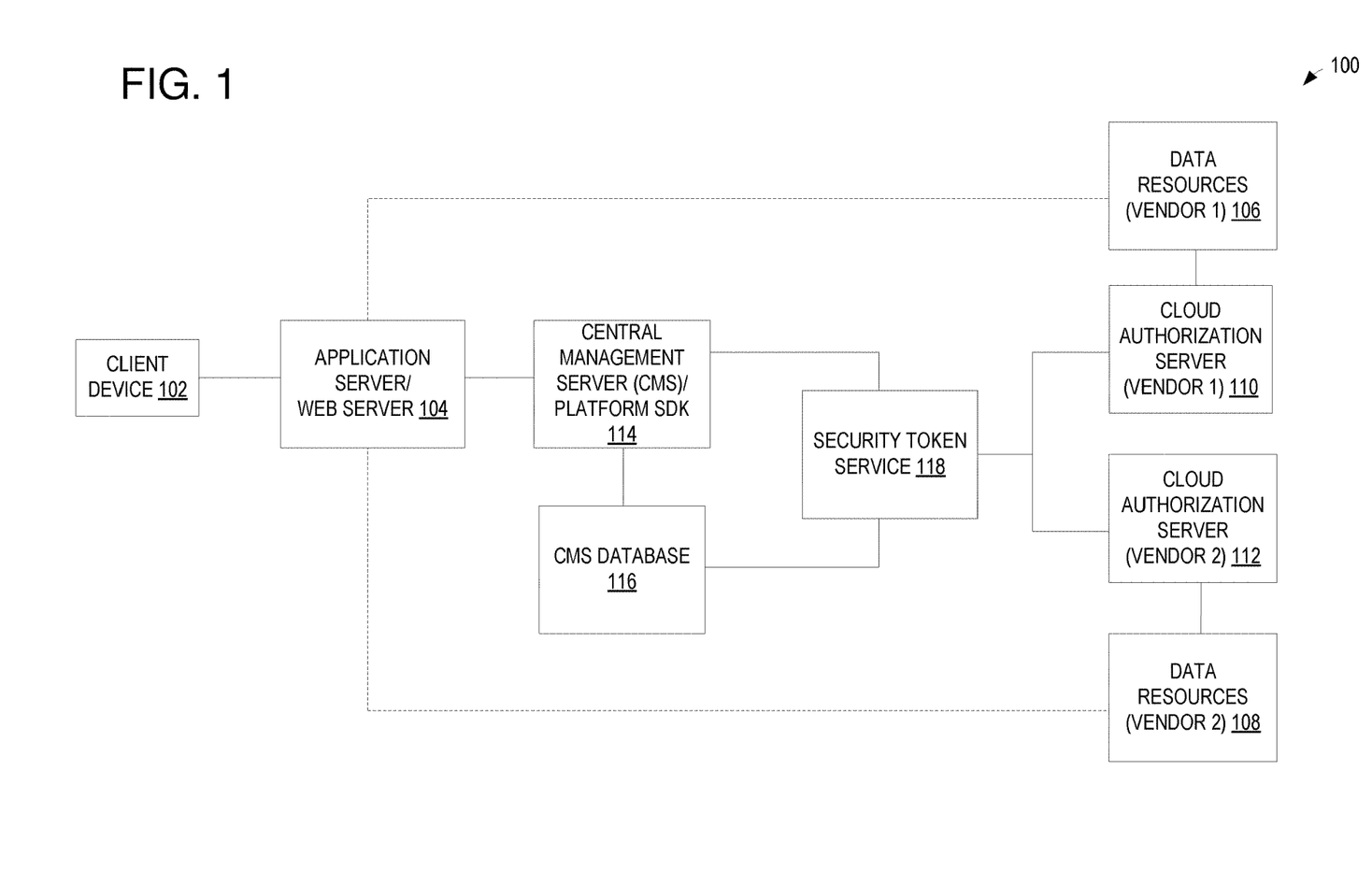
FIG. 1 is a block diagram of an example system for onboarding and managing access authorization for multiple vendors using an enterprise service(s) in accordance with examples of the present disclosure.

FIG. 1 shows an example block diagram of a system 100 for onboarding and managing multiple vendor access authorizations for an enterprise service in accordance with examples of the present disclosure. A client device 102 may be used to access an application server and/or web server 104 of an enterprise service(s). In some examples, a user of the client device 102 may request to utilize or access data resources or other services provided by other venders (e.g., data resources of vendor 1 106 and vendor 2 108 are shown in FIG. 1 for illustrative purposes; it is understood that additional vendors may be managed in a similar manner in other examples) via the application server/web server 104. In order to authorize this access, each vendor may have a respective cloud authorization server (e.g., server 110 for vendor 1 and server 112 for vendor 2), configured to receive requests and issue authorization information, such as tokens. In order to reduce the amount of queries sent to the dedicated authorization servers 110 and 112, the disclosed technologies provide an onboarding process to generate and store authorization data for later use (e.g., where subsequent requests for authorization to use the data resources 106 and 108 after onboarding are able to be serviced and authorization granted without further queries to the dedicated servers 110 and 112).

The authorization for the vendors may be onboarded using a central management server (CMS) and/or platform software development kit (SDK) 114 in coordination with a CMS database 116 and security token service (STS) 118. For example, STS 118 may include a Web-based or other service that enables users to use Single Sign-on (SSO) in heterogeneous company or multi-company networks. STS 118 may act as a token broker in some examples. For example, inside an organization's network, STS 118 may issue tokens needed for the communication between consumer and provider applications (application-to-application scenario). In an example of a multi-organization network, multiple STS services may be used to enable consumer applications to access resources from provider applications in different companies (business-to-business scenario).

A security token provides identity information about users on a Web service consumer application that requests to access resources on a Web service provider (SP) application. If the SP trusts the STS that issued the token, it allows or denies access to its resources on that basis. In this way, the Web service provider may provide access, even if it is not configured to trust the Web service consumer directly. Once identified and logged at the STS, a user can access resources from different applications that have a trust understanding with the STS. The STS may be defined by the WS-Trust 1.3 specification, an extension of the WS-Security specification of the Organization for the Advancement of Structured Information Standards (OASIS). The STS may also support metadata exchange (MEX).

In an example operation of the STS, a Web service consumer requests a security token from an STS, and the STS issues, in response, a SAML token to the consumer. The consumer packs the token along with a request for the Web service provider in a Simple Object Access Protocol (SOAP) envelope or other suitable message and sends it. The Web service provider then accepts or rejects the request based on the content of the security token.

Some aspects of the example STS operation described above may be used similarly in the disclosed system to allow authorizations to be persisted for later use without accessing a vendor-specific cloud authorization server. For example, as described in more detail below with respect to FIGS. 2 and 3, the STS 118 may be used to receive an authorization token from the authorization servers 110 and 112 during onboarding, which is then provided to the CMS server 114. The CMS server 114 is configured to generate an authorization reference infoobject storing the authorization token and/or other authorization information for the vendor, and store the infoobject in the CMS database 116 in reference to the associated vendor. Accordingly, subsequent requests for access to data resources of the vendors may provide the authorization information from the CMS database directly to the data resources without querying the corresponding authorization server.

Example Method—Operations of a Central Management Server

Figure 2:
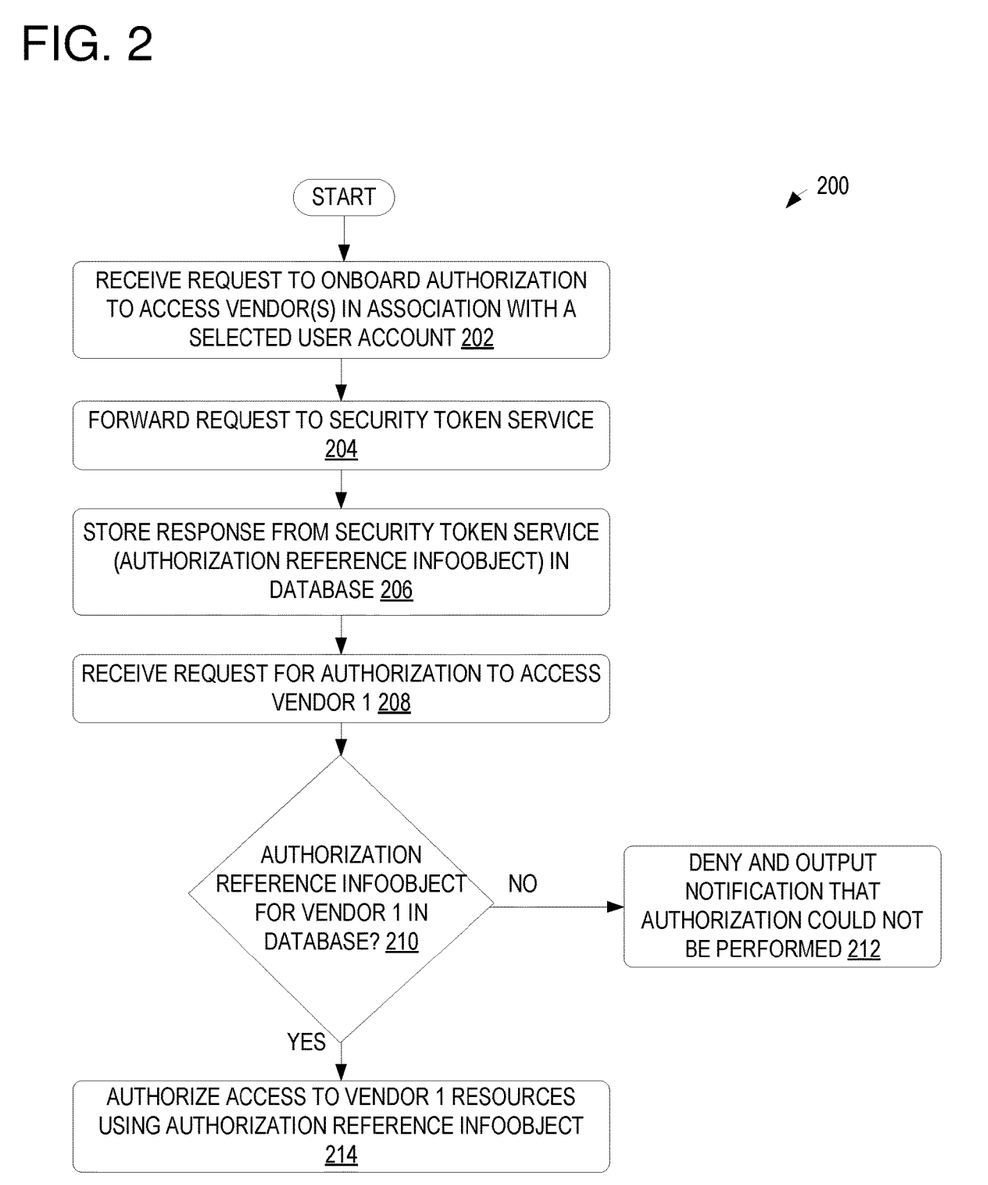
FIG. 2 is a flowchart of an example method for onboarding and managing authorization for multiple vendors in accordance with examples of the present disclosure.

FIG. 2 is a flowchart of an example method 200 for illustrating a process sequence of onboarding authorization information for multiple vendors and managing subsequent authorization requests for access to vendor resources. For example, method 200 may be performed by one or more components of a system, such as a computing system implementing the central management server 114 of FIG. 1 and related components. At 202, the method includes receiving a request to onboard authorization to access one or more vendors in association with a selected user account. For example, a request may be received via an application server/web server such as server 104 of FIG. 1, by a user setting up authorization server configurations in a central management service.

At 204, the method includes forwarding the request to a security token service, such as STS 118 of FIG. 1. As described above, the STS may perform an authorization routine using a respective authorization server of the selected vendor(s) in order to receive authorization details, such as respective tokens for authorizing access to the data resources of the vendor(s). At 206, the method includes storing a response from the STS in a database. For example, the tokens and/or other authorization details from the STS may be stored as an authorization reference infoobject in a database of the central management service.

At 208, the method includes receiving a request for authorization to access a targeted vendor (e.g., vendor 1 in the illustrated example). At 210, the method includes determining whether an authorization reference infoobject for vendor 1 is stored in the database. If such an infoobject is not stored (e.g., "NO" at 210), the method includes denying the authorization request and outputting a notification that the authorization could not be performed, as indicated at 212. In some examples, the authorization may be acquired via the vendor-specific authorization server and/or via performing an onboarding of the authorization information (e.g., as described at 202-206) for the vendor responsive to the denial (e.g., automatically or in response to an affirmative user approval directed to an output prompt requesting whether to perform such authorization/onboarding).

If the authorization reference infoobject for the targeted vendor is in the database (e.g., "YES" at 210), the method includes authorizing access to the data resources of the targeted vendor using the authorization details included in the authorization reference infoobject. For example, a token from the infoobject or generated based on information from the infoobject may be sent to the targeted vendor as proof of authorization approval to allow access to the resources through the application server/web server connected to the central management service.

Example Method—Communications Between Components

Figure 3:
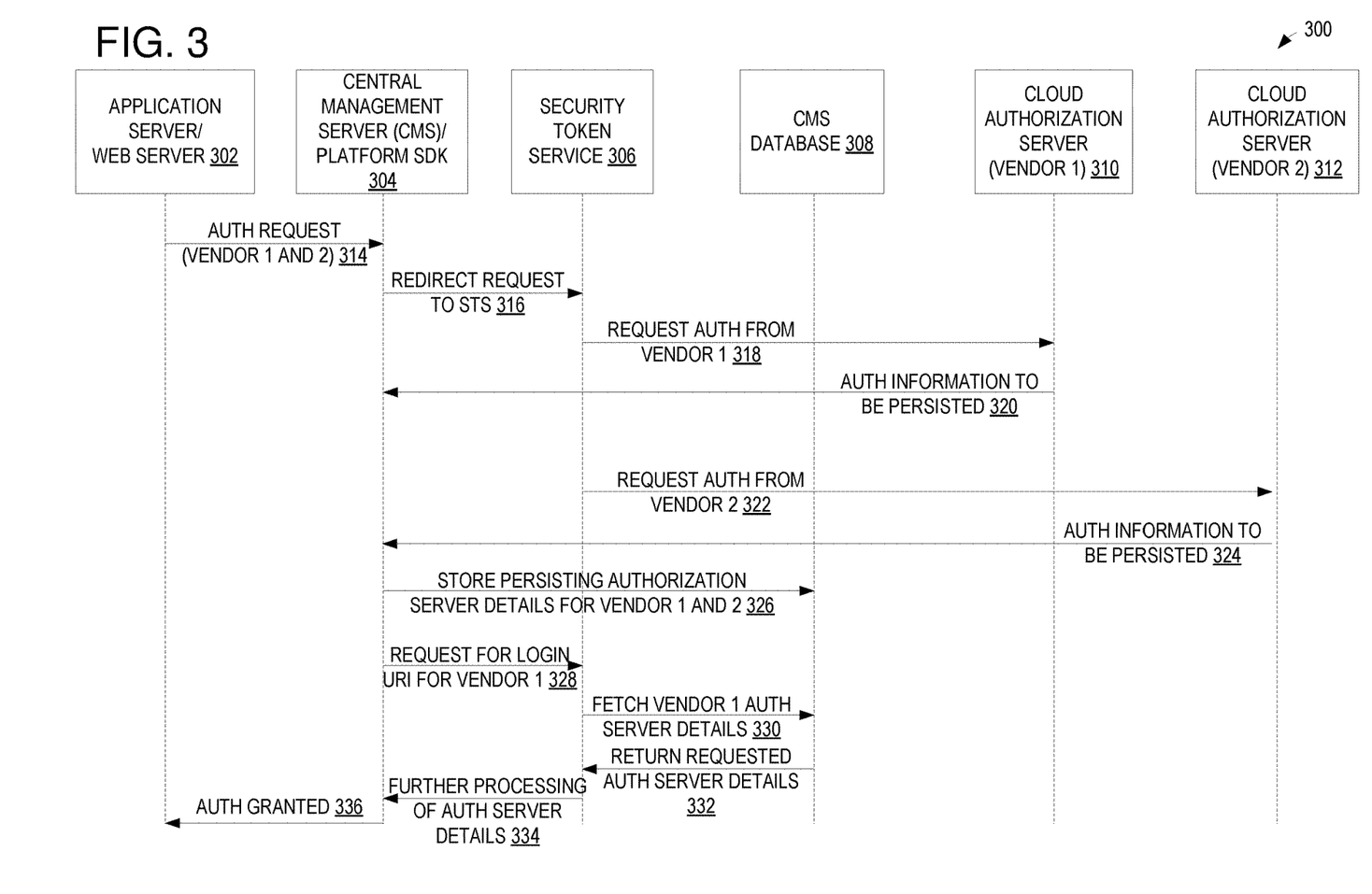
FIG. 3 is a communication diagram of example communications between components of a system such as the system of FIG. 1 to onboard and manage authorization for multiple vendors in accordance with examples of the present disclosure.

FIG. 3 is a communication diagram 300 illustrating example communications between components of a system for onboarding and managing authorization of use of data resources for multiple vendors. The components used in the communications of FIG. 3 include an application server/web server 302 (e.g., an example of server 104 of FIG. 1), central management server (CMS)/platform software development kit (SDK) 304 (e.g., an example of CMS 114 of FIG. 1), a security token service (STS) 306 (e.g., an example of STS 118 of FIG. 1), a CMS database 308 (e.g., an example of CMS database 116 of FIG. 1), a cloud authorization server for vendor 1 310 (e.g., an example of authorization server 110 of FIG. 1), and a cloud authorization server for vendor 2 312 (e.g., an example of authorization server 112 of FIG. 1). As indicated, additional descriptions of these components of FIG. 3 are provided above with respect to the respective counterparts illustrated in FIG. 1. It is to be understood that the communications shown in FIG. 3 are provided for illustrative example purposes, and additional or few communications may occur in accordance with the methods and systems described herein without departing from the scope of the disclosure.

At 314, an authorization request for onboarding vendors 1 and 2 is sent from the application server/web server 302 to the CMS/platform SDK 304. The request may include information specified via a configuration user interface, including an identification of the vendors, associated user account/login information for a user of the data resources of the vendors, and/or other information. At 316, the request is redirected to the STS 306, which is configured to perform the authorization as a trusted intermediary between the CMS 304/server 302 and the vendor (and associated authorization server). Accordingly, as indicated at 318 and 322, the STS requests an authorization for the user from the cloud authorization server for vendor 1 310 and vendor 2 312, respectively. At 320 and 324, the respective responses from the authorization servers 310 and 312 are returned to the CMS 304, including authorization information to be persisted (e.g., information to be stored as an authorization reference infoobject, as described above with respect to FIGS. 1 and 2. At 326, the CMS stores the persisting authorization server details for vendors 1 and 2 in the CMS database 308.

At 328, a request for login uniform resource identifier (URI) is provided from the CMS 304 to the STS 306. As described above, the STS is configured to first attempt to use the authorization information stored in the CMS database, rather than using the cloud authorization servers, to provide the requested authorization. Accordingly, at 330, the authorization details for vendor 1 are fetched from the CMS database, and returned to the STS at 332. At 334, the STS performs further processing of the authorization server details and sends the resulting processed data to the CMS, which propagates an indication of the granting of authorization of use of vendor 1's data resources at 336.

Example User Interface

Figure 4:
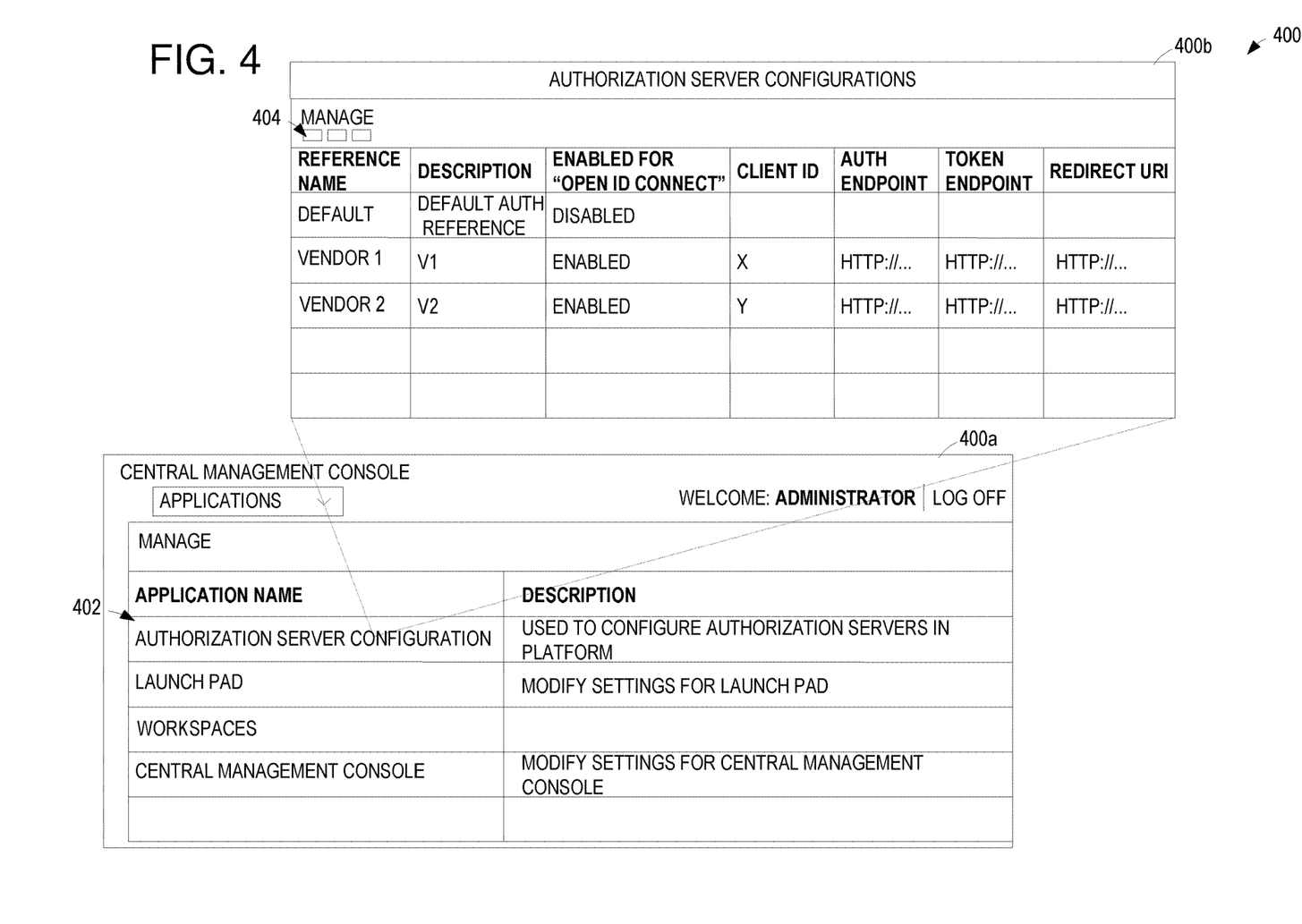
FIG. 4 shows an example administrative user interface for configuring authorization servers managed by a central management server in accordance with examples of the present disclosure.

FIG. 4 shows example user interface 400 (e.g., an administrative user interface) for performing an onboarding of authorization for data resources of multiple vendors in accordance with the technologies described herein. For example, the user interface 400 may be used to generate a request to onboard authorization as described at 314 of FIG. 3 and 202 of FIG. 2. User interface 400 includes a central management console 400a, which includes various selectable configuration options for application managed by a CMS, such as CMS 114 of FIG. 1 and/or CMS 304 of FIG. 3. Responsive to selecting the authorization server configuration option 402, a user interface window 400b may be presented to the user (e.g., an administrator) to view, edit, and/or add/remove authorization information for vendors. For example, the authorization for use of data resources for vendors 1 and 2 are already onboarded in the example of FIG. 4, and the user may select one of the user interface objects 404 to add additional authorizations, remove/edit the authorizations for vendors 1 and 2, etc. Example information that may be entered by a user/administrator when editing or adding configuration information for an authorization server may include one or more of the following: indication of whether the authorization server is to be enabled for an OpenID Connect authentication, a reference name, a description, an authorization endpoint, a token endpoint, a client ID, a client secret, a redirect URI, a revocation endpoint, an authorization scope, a type of data resource to which access is to be granted (e.g., a particular resource, or an indication that any data resource [e.g., "Agnostic"] is to be accessible when authorized), an access type (e.g., offline, online, etc.). In one example, where the user selects the user interface object for adding a new authorization, the system may, in response, perform the operations described above in FIGS. 2 and 3 to onboard the new authorization using the entered configuration information.

Figure 5:
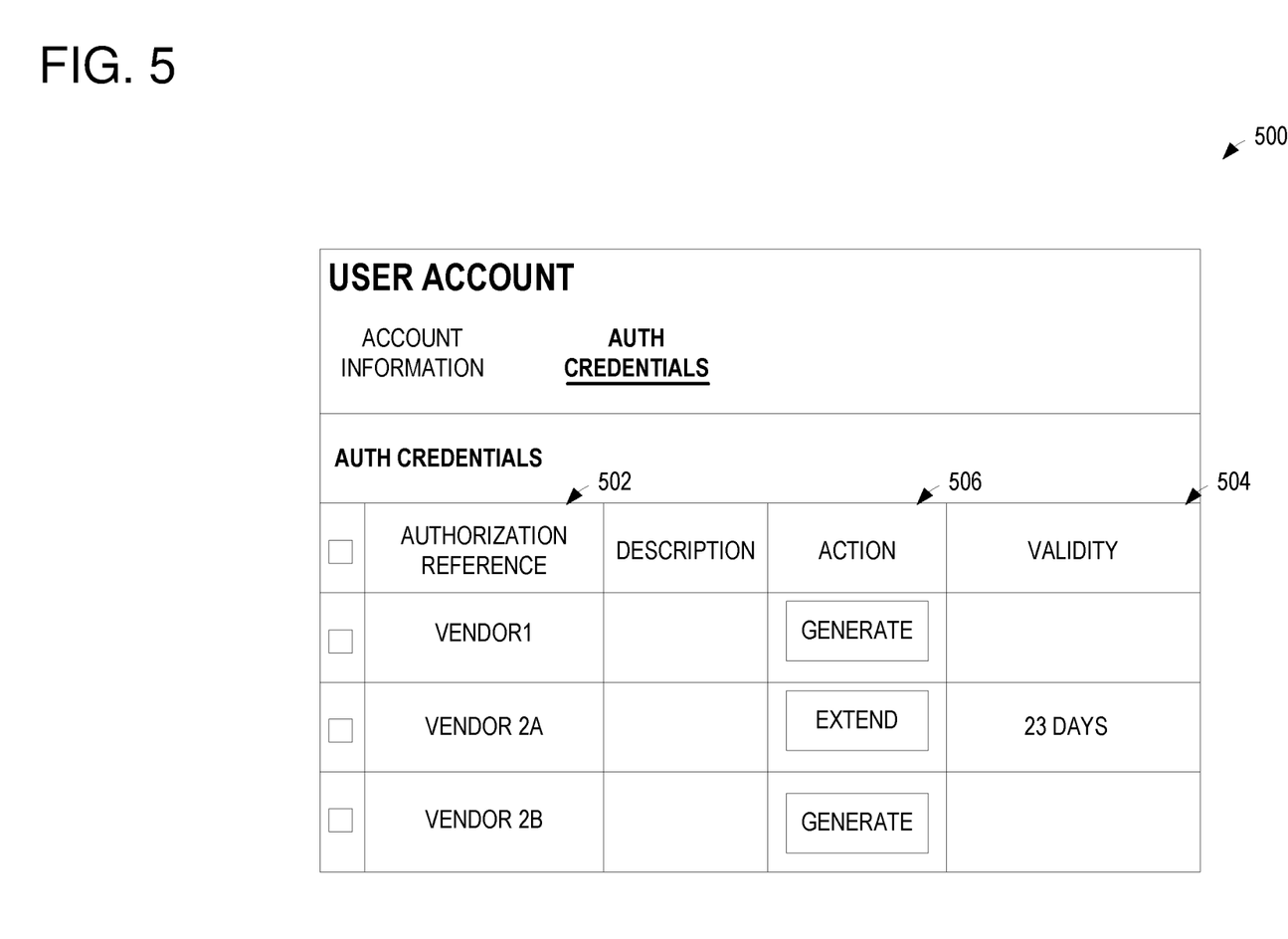
FIG. 5 shows an example user interface for user preferences for authorization servers managed by a central management server in accordance with examples of the present disclosure

FIG. 5 shows an example user interface 500 showing user preferences for authorization token management. For example, where the user interface 400 of FIG. 4 may be used by an administrator for onboarding vendor-specific authorizations, the user interface 500 of FIG. 5 may be provided to allow users to perform some actions to manage their authorizations. As shown, the user interface 500 indicates the available authorization references 502 and a validity status 504 (e.g., a time until expiration of the token/reference if not already expired). For example, after a successful login, the token validity may be visible in a user preferences interface under an authorization tokens tab of a user account section.

The user interface 500 further includes an action column 506, which includes respective selectable user interface elements for performing an action relating to the corresponding authorization reference. For example, as shown, for authorization references that are expired or not yet set up (e.g., vendor 1 and vendor 2b), selectable user interface elements are provided which, when selected, cause generation of an authorization reference (e.g., triggering performance of the onboarding described above with respect to FIGS. 2 and 3). For authorization references that are not yet expired (e.g., vendor 2a), selectable user interface elements are provided which, when selected, cause an extension of the authorization reference (e.g., triggering a request to be sent from an STS to the respective cloud authentication server for the vendor to extend the time of validity for a respective authorization reference/token). In some examples, if the authorization server configured is of any DB/Data resources, then the refresh token for the same may be automatically generated without any further action by the user.

Accordingly, the user interface 500 may be part of a launchpad, and the listed authorization references may be used to generate saved tokens (e.g., OAuth tokens) from user preferences. In some examples, the user may be able to generate only one token per authorization reference in the launchpad. If the current user already has a valid token for a given authorization reference, then the validity column may display the number of days before the expiration date of the token, and the "extend" user interface element may be displayed to allow user updating or extending the current token for the given authorization reference in the launch pad. When the user selects the generate or extend user interface element for a given authorization reference, the user may be invited to authenticate via a supplier authentication page according to the authorization reference configuration. The supplier authentication page may be redirected and displayed as a modeless popup window, separated from the launchpad in some examples. During the authentication process, the launchpad may pop up a message and wait for the end of user authentication. In addition, the user may be able to reset or delete an existing token for an authorization reference in the launchpad using a similar process.

Figure 6:
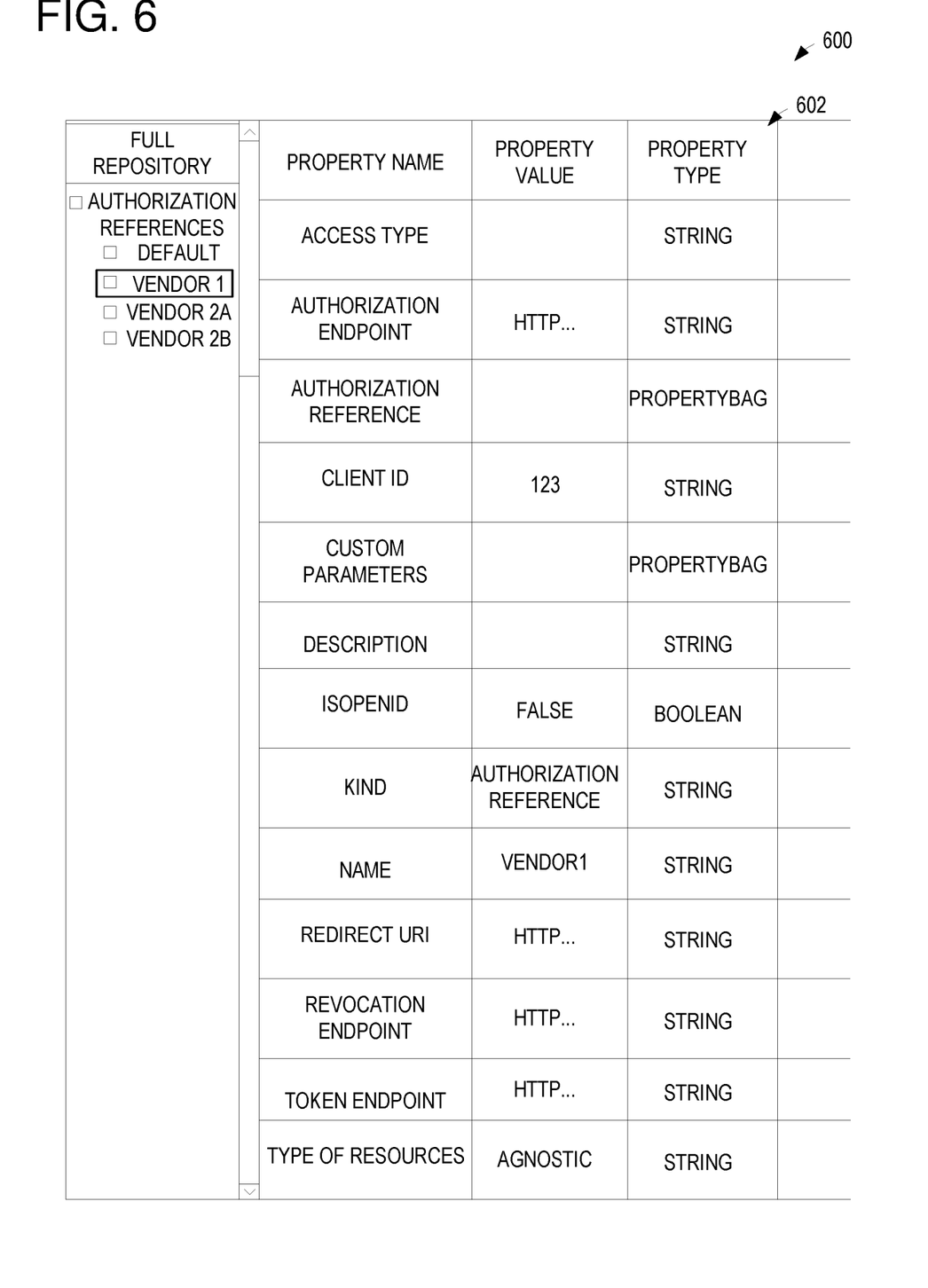
FIGS. 6 and 7 show example user interfaces for a repository representing contents of a central management server database including authorization reference objects in accordance with examples of the present disclosure.
Figure 7:
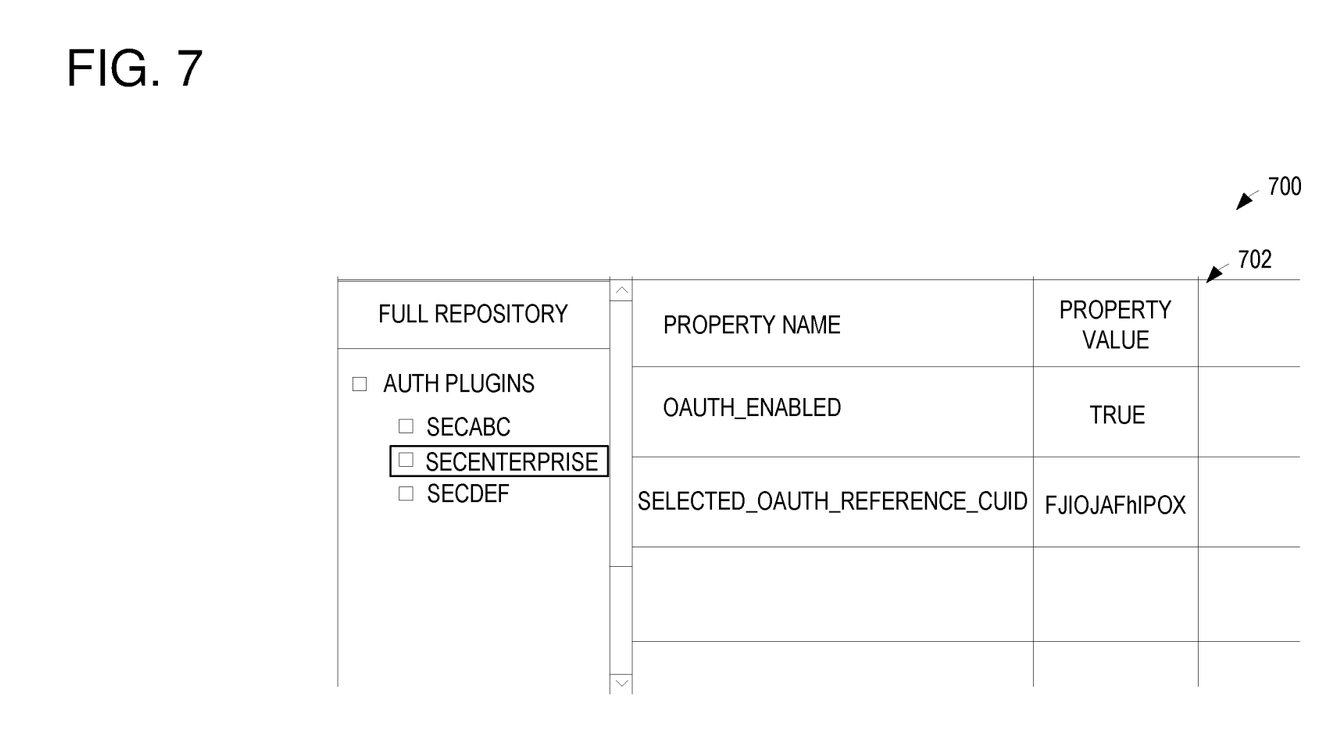

FIGS. 6 and 7 show example user interfaces 600 and 700 for a repository representing the contents of a CMS database. As shown at 602 of FIG. 6, authorization details are stored in the CMS database, including authorization reference infoobjects, which store information about the authorization servers for onboarded vendors (e.g., as described above with respect to FIGS. 2 and 3). At 702 of FIG. 7, the properties that are exposed to create a secured session using the authorization reference infoobjects are shown, indicating that exposed data is minimal in comparison to performing a direct authorization/authentication with the corresponding vendor for an associated session to use the vendor's data resources.

Example Advantages

With the introduction of the authorization reference infoobject, a dependency is removed for the use of other authorization protocols (e.g., OAuth properties) which are used to store the authorization server configuration details in a file. Instead of that, generic APIs in the backend SDK are used to perform authorization, increasing security by reducing exposure of security information to outside parties. Furthermore, the disclosed technologies build a solid infrastructure for enterprise services to onboard multiple vendors to use OAuth authentication as SSO. Once the required details are stored in the repository, it becomes easy for the all the consumers to access it with the help of backend Java SDK APIs, thereby increasing overall efficiency and user friendliness of the system.

A Generalized Computer Environment

Figure 8:
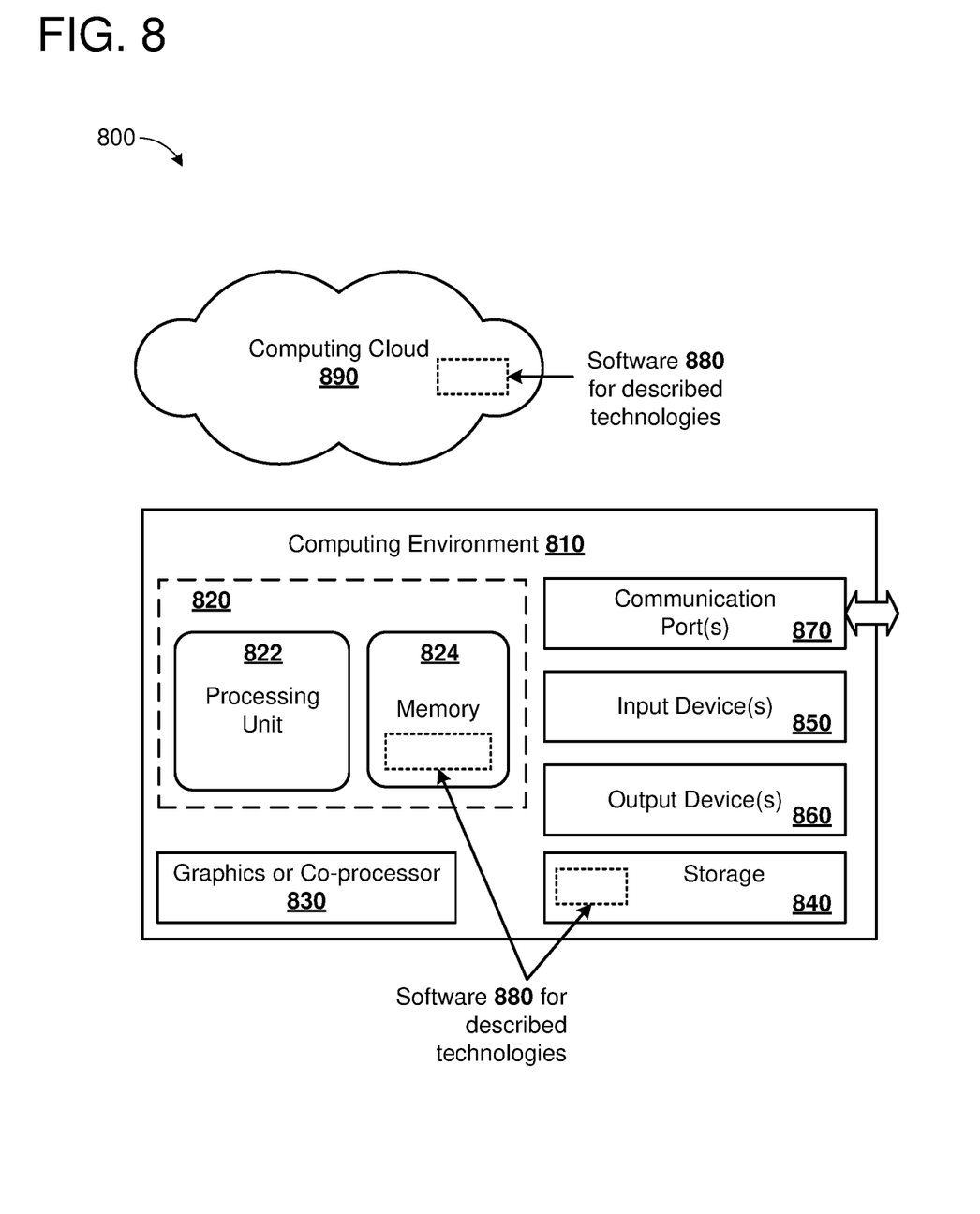
FIG. 8 is a diagram schematically depicting a computing environment suitable for implementation of disclosed technologies.

FIG. 8 illustrates a generalized example of a suitable computing system 800 in which described examples, techniques, and technologies, including calculating sustainability footprints according to disclosed technologies can be implemented. The computing system 800 is not intended to suggest any limitation as to scope of use or functionality of the present disclosure, as the innovations can be implemented in diverse general-purpose or special-purpose computing systems.

With reference to FIG. 8, computing environment 810 includes one or more processing units 822 and memory 824. In FIG. 8, this basic configuration 820 is included within a dashed line. Processing unit 822 executes computer-executable instructions, such as for implementing any of the methods or objects described herein for performing queries on a composite graph data structure representing a dynamic system, or various other architectures, components, handlers, managers, modules, or services described herein. Processing unit 822 can be a general-purpose central processing unit (CPU), a processor in an application-specific integrated circuit (ASIC), or any other type of processor. In a multi-processing system, multiple processing units execute computer-executable instructions to increase processing power. Computing environment 810 can also include a graphics processing unit or co-processing unit 830. Tangible memory 824 can be volatile memory (e.g., registers, cache, or RAM), non-volatile memory (e.g., ROM, EEPROM, or flash memory), or some combination thereof, accessible by processing units 822, 830. The memory 824 stores software 880 implementing one or more innovations described herein, in the form of computer-executable instructions suitable for execution by the processing unit(s) 822, 830. The memory 824 can also store footprint calculation data, a composite graph data structure, including nodes, edges, and their respective attributes; a table or other data structure indicating states of a modeled system, configuration data, UI displays, browser code, data structures including data tables, working tables, change logs, output structures, input fields, output fields, data values, indices, or flags, as well as other operational data.

A computing system 810 can have additional features, such as one or more of storage 840, input devices 850, output devices 860, or communication ports 870. An interconnection mechanism (not shown) such as a bus, controller, or network interconnects the components of the computing environment 810. Typically, operating system software (not shown) provides an operating environment for other software executing in the computing environment 810, and coordinates activities of the components of the computing environment 810.

The tangible storage 840 can be removable or non-removable, and includes magnetic disks, magnetic tapes or cassettes, CD-ROMs, DVDs, or any other medium which can be used to store information in a non-transitory way and which can be accessed within the computing environment 810. The storage 840 stores instructions of the software 880 (including instructions and/or data) implementing one or more innovations described herein.

The input device(s) 850 can be a mechanical, touch-sensing, or proximity-sensing input device such as a keyboard, mouse, pen, touchscreen, trackball, a voice input device, a scanning device, or another device that provides input to the computing environment 810. The output device(s) 860 can be a display, printer, speaker, optical disk writer, or another device that provides output from the computing environment 810.

The communication port(s) 870 enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 800 can also include a computing cloud 890 in which instructions implementing all or a portion of the disclosed technology are executed. Any combination of memory 824, storage 840, and computing cloud 890 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, software objects, classes, components, data structures, etc. that perform tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in a hardware processor or another form of physical computer hardware, and thus include both software associated with virtualization and underlying hardware.

Example Cloud Computing Environment

Figure 9:
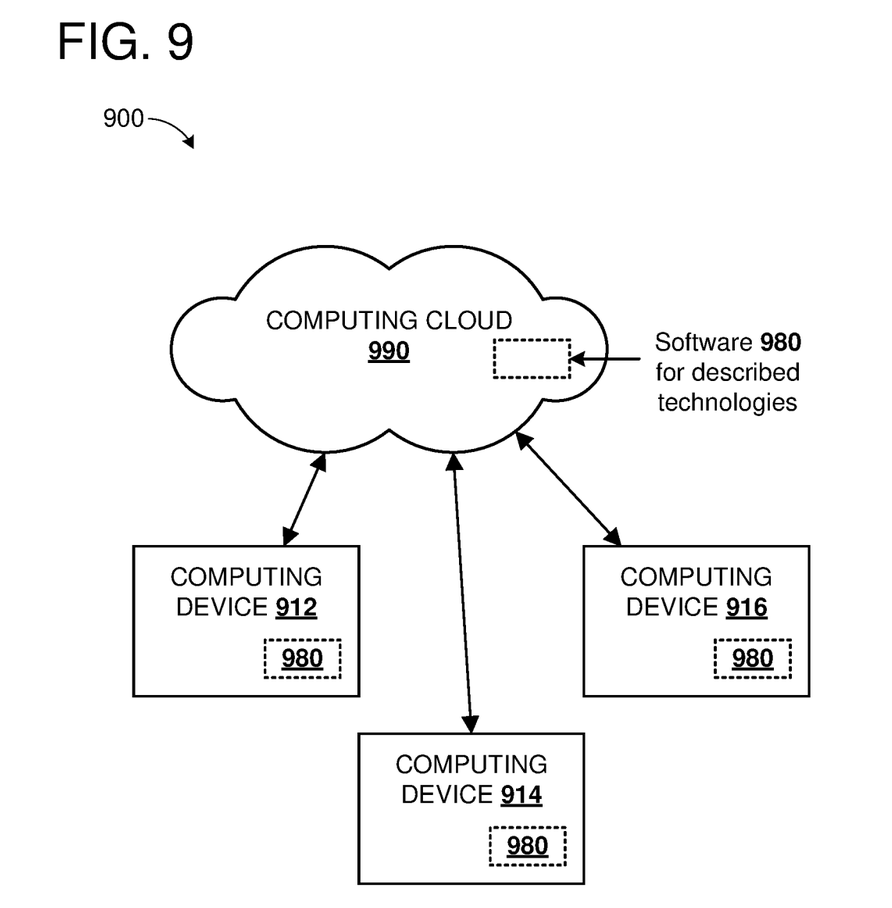
FIG. 9 is a diagram schematically depicting computing devices operating in conjunction with a computing cloud for implementation of disclosed technologies.

FIG. 9 depicts an example cloud computing environment 900 in which the described technologies can be implemented. The cloud computing environment 900 comprises a computing cloud 990 containing resources and providing services. The computing cloud 990 can comprise various types of cloud computing resources, such as computer servers, data storage repositories, networking resources, and so forth. The computing cloud 990 can be centrally located (e.g., provided by a data center of a business or organization) or distributed (e.g., provided by various computing resources located at different locations, such as different data centers and/or located in different cities or countries).

The computing cloud 990 can be operatively connected to various types of computing devices (e.g., client computing devices), such as computing devices 912, 914, and 916, and can provide a range of computing services thereto. One or more of computing devices 912, 914, and 916 can be computers (e.g., servers, virtual machines, embedded systems, desktop, or laptop computers), mobile devices (e.g., tablet computers, smartphones, or wearable appliances), or other types of computing devices. Communication links between computing cloud 990 and computing devices 912, 914, and 916 can be over wired, wireless, or optical links, or any combination thereof, and can be short-lived or long-lasting. Communication links can be continuous or sporadic. These communication links can be stationary or can move over time, being implemented over varying paths and having varying attachment points at each end. Computing devices 912, 914, and 916 can also be connected to each other.

Computing devices 912, 914, and 916 can utilize the computing cloud 990 to obtain computing services and perform computing operations (e.g., data processing, data storage, and the like). Particularly, software 980 for performing the described innovative technologies can be resident or executed in the computing cloud 990, in computing devices 912, 914, and 916, or in a distributed combination of cloud and computing devices.

General Considerations

As used in this disclosure, the singular forms "a," "an," and "the" include the plural forms unless the surrounding language clearly dictates otherwise. Additionally, the terms "includes" and "incorporates" mean "comprises." Further, the terms "coupled" or "attached" encompass mechanical, electrical, magnetic, optical, as well as other practical ways of coupling items together, and does not exclude the presence of intermediate elements between the coupled items. Furthermore, as used herein, the terms "or" and "and/or" mean any one item or combination of items in the phrase.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 6, computer-readable storage media include memory 624, and storage 640. The term computer-readable storage media does not include signals and carrier waves. In addition, the term computer-readable storage media does not include communication ports (e.g., 670) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ABAP, Adobe Flash, Angular, C, C++, C#, Curl, Dart, Fortran, Go, Java, JavaScript, *Julia*, Lisp, Matlab, Octave, Perl, Python, R, Ruby, SAS, SPSS, WebAssembly, any derivatives thereof, or any other suitable programming language, or, in some examples, markup languages such as HTML or XML, or in any combination of suitable languages, libraries, and packages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the disclosed principles may be applied, it should be recognized that the illustrated embodiments are only preferred examples and should not be taken as limiting the scope. Rather, the scope is defined by the following claims. We therefore claim all that comes within the scope and spirit of these claims.

We claim:

1. One or more computer-readable storage media storing instructions which, when executed by one or more hardware processors, cause the hardware processors to perform actions comprising:
   receiving a request to onboard an authorization for access to data resources of a targeted vendor;
   receiving, from an authorization server for the targeted vendor, authorization information;
   generating an authorization reference object, the authorization reference object storing the authorization information;
   storing the authorization reference object in a database;
   servicing subsequent requests for access to the data resources of the targeted vendor using the authorization reference object stored in the database; and
   generating a user preferences user interface for managing the authorization reference object, the user preferences user interface including one or more selectable user interface elements for performing a management action relating to the authorization reference object, the management action including generating new authorization information for the authorization reference object or extending a time of validity for the authorization information.

2. The one or more computer-readable storage media of claim 1, wherein the authorization information includes an authorization token generated by the authorization server, and wherein servicing the subsequent requests for access to the data resources comprises sending the token to the vendor.

3. The one or more computer-readable storage media of claim 1, wherein the actions further comprise forwarding the request to a security token service, wherein the security token service is trusted by the authorization server for the targeted vendor.

4. The one or more computer-readable storage media of claim 3, wherein the authorization information is received from the authorization server via the security token service.

5. The one or more computer-readable storage media of claim 1, wherein the data resources comprise first data resources and the targeted vendor comprises a first targeted vendor, wherein the actions further comprise receiving a request for access to second data resources of a second targeted vendor, and wherein the actions further comprise querying the database for a second authorization reference object corresponding to the second targeted vendor.

6. The one or more computer-readable storage media of claim 5, wherein the actions further comprise, responsive to determining that the second authorization reference object is not stored in the database, denying the request for access to the second data resources and outputting a notification indicating the denial of the request for access to the second data resources.

7. The one or more computer-readable storage media of claim 1, wherein the request to onboard the authorization is generated based on an Application Programming Interface call triggered by interaction of an administrator with a user interface for configuring a central management server.

8. The one or more computer-readable storage media of claim 1, wherein the actions further comprise requesting a refreshed authorization token for the access to the data resources of the targeted vendor responsive to user input to the user preferences user interface, the user input directed to a selected interface element of the one or more selectable interface elements, the selected interface element associated with the management action for extending the time of validity of the authorization information for the authorization reference object.

9. The one or more computer-readable storage media of claim 8, wherein the authorization reference object is updated to store the refreshed authorization token responsive to receiving the refreshed authorization token from the authorization server.

10. The one or more computer-readable storage media of claim 9, wherein the user preferences user interface is updated to reflect an updated validity time period associated with an expiration of the refreshed authorization token.

11. The one or more computer-readable storage media of claim 1, wherein the actions further comprise requesting a new authorization token for the access to the data resources of the targeted vendor responsive to user input to the user preferences user interface, the user input directed to a selected user interface element of the one or more selectable user interface elements, the selected user interface element associated with the management action for generating the new authorization information token-after expiration of the authorization reference object.

12. A method performed by a computer, the method comprising:
receiving, at a central management server from an application or web server, a request to onboard an authorization for access to data resources of a plurality of targeted vendors;
redirecting the request to a security token service (STS) that has an established trust relationship with the targeted vendors;
for each of the targeted vendors, receiving, from a respective authorization server for the respective targeted vendor via the STS, respective authorization information including a respective authorization token for access to the data resources for the respective targeted vendor;
for each of the targeted vendors, generating a respective authorization reference object, the respective authorization reference object storing the respective authorization information including the respective authorization token for the respective targeted vendor;
storing the authorization reference objects in a central management server database;
generating a user preferences user interface for managing the authorization reference objects, the user preferences user interface including a selectable user interface element associated with a selected authorization reference object of the authorization reference objects and selectable to perform a management action for the selected authorization reference object, the management action including generating a new authorization token for the selected authorization reference object or extending a time of validity for the respective authorization token for the selected authorization reference object; and
responsive to receiving a subsequent request for logging into an account associated with a selected targeted vendor, fetching the authorization reference from the central management server database corresponding to the selected targeted vendor and granting access of the application or web server to the data resources of the selected targeted vendor using the authorization information from the authorization reference object corresponding to the selected targeted vendor.

13. The method of claim 12, wherein the plurality of targeted vendors includes a first vendor and a second vendor, and wherein the respective authorization server for the first vendor is different from the respective authorization server for the second vendor.

14. The method of claim 12, wherein the subsequent request is a first login request, and wherein responsive to receiving a second login request for logging into an account associated with a further selected targeted vendor that is not included in the plurality of targeted vendors, denying access to the second data resources and outputting a notification indicating the denial of the second login request.

15. The method of claim 14, further comprising redirecting the request to the STS to onboard the further selected targeted vendor by generating and storing in the central management server database a respective authorization reference object that includes a respective authorization token received from a respective authorization server for the further selected targeted vendor via the STS.

16. A system, comprising:
one or more hardware processors with memory coupled thereto;
computer-readable media storing instructions executable by the one or more hardware processors, the instructions comprising:
first instructions to generate an administrative user interface for configuring authorization servers managed by a central management server;
second instructions to, responsive to receiving user input to the administrative user interface requesting to onboard authorization for access to data resources of a targeted vendor, generate a request that controls the central management server to:
receive, via an intermediate security token service (STS), authorization information from an authorization server for the targeted vendor,
generate and store, in a database of the central management service, an authorization reference infoobject associated with the targeted vendor based on the authorization information, and
grant subsequent requests for access to the data resources of the targeted vendor using the authorization reference infoobject stored in the database; and
third instructions to generate a user preferences user interface for managing the authorization reference infoobject, the user preference user interface indicating a validity time frame for the authorization reference infoobject.

17. The system of claim 16, wherein the subsequent requests for access are received from a user interface of an application or web server associated with the central management server.

18. The system of claim 16, wherein the authorization information includes an authorization token generated by the authorization server for the targeted vendor.

19. The system of claim 18, wherein the user preferences user interface includes one or more user interface elements selectable to perform an associated management action on the authorization reference infoobject, and wherein the instructions further comprise fourth instructions to, responsive to receiving user input directed to the a selected user interface element of the one or more user interface elements requesting to refresh an authorization for the access to the data resources of the targeted vendor, generate a refresh request that controls the central management server to:

receive, via an intermediate security token service (STS), updated authorization information from the authorization server for the targeted vendor including an updated authorization token, and     update the authorization reference infoobject associated with the targeted vendor that is stored in the database to include the updated authorization token.

20. The system of claim 19, wherein the instructions further comprise fifth instructions to update the user preferences user interface to indicate an updated validity time frame for the authorization reference infoobject associated with the targeted vendor.

\* \* \* \* \*